US010827762B2

(12) United States Patent
Jakobsen

(10) Patent No.: US 10,827,762 B2
(45) Date of Patent: Nov. 10, 2020

(54) INFEED SYSTEM FOR RECEIVING AND TURNING INCOMING FOOD PRODUCTS PRIOR TO ENTERING A PROCESSING MACHINE

(71) Applicant: MAREL SALMON A/S, Stovring (DK)

(72) Inventor: Bjarne Kjeld Jakobsen, Nibe (DK)

(73) Assignee: MAREL SALMON A/S, Stovring (DK)

( * ) Notice: Subject to any disclaimer, the term of this patent is extended or adjusted under 35 U.S.C. 154(b) by 0 days.

(21) Appl. No.: 16/484,259

(22) PCT Filed: Feb. 8, 2018

(86) PCT No.: PCT/EP2018/053198
§ 371 (c)(1),
(2) Date: Aug. 7, 2019

(87) PCT Pub. No.: WO2018/146203
PCT Pub. Date: Aug. 16, 2018

(65) Prior Publication Data
US 2020/0000110 A1 Jan. 2, 2020

(30) Foreign Application Priority Data
Feb. 8, 2017 (DK) .................................. 2017 70081

(51) Int. Cl.
*A22C 25/00* (2006.01)
*A22C 25/08* (2006.01)
*B65G 47/248* (2006.01)

(52) U.S. Cl.
CPC ............ *A22C 25/08* (2013.01); *B65G 47/248* (2013.01)

(58) Field of Classification Search
CPC .......... A22C 25/00; A22C 25/08; A22C 25/12
(Continued)

(56) References Cited

U.S. PATENT DOCUMENTS 2,961,696 A * 11/1960 Michael .................. A22C 25/08
452/179
3,237,750 A * 3/1966 Bergh ..................... A22C 25/12
198/400
(Continued)

FOREIGN PATENT DOCUMENTS

DE 102015104049 A1 9/2016
GB 1034438 A 6/1966
(Continued)

OTHER PUBLICATIONS

Danish Search Report from DK Application No. PA 201770081, dated Jun. 26, 2017.
(Continued)

*Primary Examiner* — Richard T Price, Jr.
(74) *Attorney, Agent, or Firm* — Workman Nydegger

(57) ABSTRACT

An infeed system is arranged for receiving and turning incoming food products before entering a processing machine. The food products are arranged so a longitudinal axis of the food products is essentially parallel to a conveying direction of the incoming food products. The system comprises a pair of conveyor structures having at least two side by side arranged endless belts extending from an infeed end of the infeed system to an outfeed end of the infeed system. The belts are twisted towards the outfeed end so at the outfeed end the conveyor structures are arranged side by side. At the infeed end, the incoming food products are received and clamped between the belts of the conveyor structures and advanced from the infeed end towards the outfeed end while simultaneously rotating the received food products around said longitudinal axis of the food products.

13 Claims, 3 Drawing Sheets

(58) Field of Classification Search
USPC .................................................. 452/177, 179
See application file for complete search history.

(56) References Cited

U.S. PATENT DOCUMENTS

| | | | |
|---|---|---|---|
| 3,498,442 A | | 3/1970 | Eriksen |
| 4,613,031 A | * | 9/1986 | Wenzel .................. A22C 25/12 |
| | | | 452/179 |
| 5,330,383 A | | 7/1994 | Ryan |
| 7,575,508 B2 | * | 8/2009 | Goodrick ............... A22B 3/083 |
| | | | 452/57 |
| 2004/0084282 A1 | | 5/2004 | Hellmann et al. |
| 2008/0261504 A1 | * | 10/2008 | Busch .................. B65G 47/252 |
| | | | 452/179 |
| 2009/0156109 A1 | * | 6/2009 | Goodrick ............... A22B 3/083 |
| | | | 452/57 |
| 2010/0240289 A1 | * | 9/2010 | Kragh .................... A22C 25/12 |
| | | | 452/163 |

FOREIGN PATENT DOCUMENTS

| | | |
|---|---|---|
| JP | S6098938 A | 6/1985 |
| WO | 2007101313 A1 | 9/2007 |
| WO | 2010081708 A1 | 7/2010 |
| WO | 2016128449 A1 | 8/2016 |

OTHER PUBLICATIONS

International Search Report from PCT Application No. PCT/EP2018/053198, dated May 4, 2018.

* cited by examiner

INFEED SYSTEM FOR RECEIVING AND TURNING INCOMING FOOD PRODUCTS PRIOR TO ENTERING A PROCESSING MACHINE

FIELD OF THE INVENTION

The present invention relates to an infeed system for receiving and turning incoming food products, in particular de-headed fish, prior to entering a processing machine.

BACKGROUND OF THE INVENTION

Food processing machines often require manual labor for correctly placing food products e.g. into a food product holder. An example of such a food processing machine is a fish filleting machine where manual labor is required for placing a de-headed fish into a fish holder that is advanced through the fish filleting machine while one or more processing steps are performed. Obviously, this results in higher costs for fish processing plants.

SUMMARY OF THE INVENTION

On the above background, it is an object of embodiments of the present invention to provide an infeed system that is capable of automatically feeding any type of food product into a food processing machine.

In general, the invention preferably seeks to mitigate, alleviate or eliminate one or more of the above mentioned disadvantages of the prior art singly or in any combination. In particular, it may be seen as an object of embodiments of the present invention to provide a system that solves the above mentioned problems, or other problems.

To better address one or more of these concerns, in a first aspect of the invention, an infeed system is provided for receiving and turning incoming food products, in particular de-headed fish, prior to entering a processing machine, where the food products are arranged such that a longitudinal axis of the food products is essentially parallel to a conveying direction of the incoming food products, comprising:

- a pair of conveyor structures, where each of the conveyor structures comprises at least one endless belt extending from an infeed end of the infeed system to an outfeed end of the infeed system, where, at the infeed end, the conveyor structures are arranged above and below each other, and where the belts are twisted towards the outfeed end such that, at the outfeed end, the conveyor structures are arranged side by side,
- The infeed system further comprises a driving unit for driving the conveyor structures in opposite rotational directions such that adjacent sides of the conveyor structures are moving in the same direction from the infeed end towards the outfeed end, wherein, at the infeed end, the incoming food products are received and clamped between the belts of the conveyor structures and advanced from the infeed end towards the outfeed end while simultaneously rotating the received food products around said longitudinal axis of the food products.

Accordingly, a simple solution is provided that is capable of automatically feeding all kinds of food products, e.g. soft food products, having a complicated shape such as de-headed fish, into a processing machine. Due to the flexibility of the belts, which typically are made of plastic or plastic type material, the belts will easily adapt to the shape of the food product meaning that the infeed system is capable of receiving all kinds of food products having different texture, shape, softness etc., e.g. a de-headed fish. As an example, the incoming food products may be food products from a de-header machine, and said processing machine may be a fish filleting machine, but until now, the infeed into such a fish filleting machine has been a manual process.

Each of the belts may extend between a first wheel at the infeed end and a second wheel at the outfeed end, the first wheel defining a first wheel rotation axis about which the first wheel is rotatable and extending in a first direction and the second wheel defining a second wheel rotation axis about which the second wheel is rotatable and extending in a second direction different from the first direction.

The first direction, i.e. the rotation axis of the wheel at the infeed end, may be inclined. Herein, inclined means that it forms an angle to horizontal, e.g. an angle of 10-20°, preferably around 15° relative to horizontal. The risk of damaging the belts due to the twist of the belts is thus reduced, while simultaneously, it is ensured that the incoming food products are received at the infeed end.

The second direction could be at an angle of 80-90° relative to horizontal, i.e. the second wheel could e.g. be vertical or nearly vertical.

Herein, references to vertical, horizontal, or other directions are to be considered relative to an orientation intended for use of the system, and particularly, the directions define directions of elements relative to other elements of the system, e.g. the direction of the first direction relative to the second direction. The angle of the first direction to the second direction may particularly be between 50 and 90 degrees, such as between 60 and 80 degrees.

In one embodiment, each of the belts extends between a driving wheel comprising said driving unit and an idle wheel. One of the aforementioned first and second wheels could be the idle wheel and the other one of the first and second wheel could be the driving wheel. Particularly, the driving wheel could be the second wheel and the idling wheel could be the first wheel such that the driving wheel is at the outfeed end.

The tightness of each of the belts could be adjustable. The tightness may e.g. be based on adjusting the position of the belts or the position of the idling wheel relative to the driving wheel, and it could be adjusted e.g. depending on the thickness of the food products. In one embodiment, the tightness is adjusted automatically via the elasticity of the belt. Accordingly, the tightness may be adjusted to ensure that the food products do not fall out of the infeed system during the conveyance from said infeed end to said outfeed end.

In one embodiment, at the outfeed end, the ends of the pair of conveyor structures are connected to a spring load with a resulting spring force pointing towards each other, and where, during advancing the food products from the infeed end towards the outfeed end, the ends of the pair of conveyor structures follow the thickness of the food products. The pair of wheels at the outfeed end, which may be the driving wheels, may as an example, be connected to said spring load. Accordingly, it is ensured that the tightness is preserved and adapted to the different thicknesses of food products while being advanced where the outfeed ends simply follow the outer shape of the food products.

In one embodiment, the infeed system further comprises a moving device connected to the conveyor structures at the infeed end and configured to, in response to a control signal indicating a position of an incoming food product, increase the distance between the conveyor structures until the food product is at least partly received, and subsequently decreasing the distance between the conveyor structures at the infeed end. In that way, the step of receiving the incoming food product, e.g. de-headed fish, is facilitated and it is ensured that the food product does not become blocked at the infeed end. Also, the subsequent decrease in the distance between the conveyor structures ensures that the food product is clamped sufficiently such that it is ensured that the food product does not slide out of the infeed system during the conveyance from the infeed end to the outfeed end. Such a distance adjustment between the conveyor structures may be performed by adjusting the distance of said driving/idle wheels at the infeed end.

In one embodiment, the infeed system further comprises a support structure positioned between the infeed end and the outfeed end and configured to supply a pressure onto at least one of said adjacent sides of the conveyor structures toward the other adjacent side. In that way, it is ensured that a sufficient tightness is preserved at all times. The pressure is, of course, adjusted to the geometrical size and shape of the food product and preferably also to the weight of the food product, so as to ensure that the food product will not slide from the infeed system during the conveyance.

Each of the conveyor structures comprises at least one single belt, particularly, each conveyor structure may be defined a first wheel, a second wheel, and a single endless belt extending between the first and second wheels. In other embodiments of the infeed system, each of the conveyor structures comprises at least two side by side arranged endless belts, e.g. three or four side by side arranged endless belts, each belt extending side by side between the first and second wheels.

In a second aspect of the invention a method is provided of receiving and turning incoming food products, in particular de-headed fish, prior to entering a processing machine, where the food products are arranged such that a longitudinal axis of the food products is essentially parallel to a conveying direction of the incoming food products, where the receiving and turning is performed by an infeed system which comprises:
- a pair of conveyor structures, where each of the conveyor structures comprises at least one endless belt extending from an infeed end of the infeed system to an outfeed end of the infeed system, where at the infeed end the conveyor structures are arranged above and below each other, and where the belts are twisted towards the outfeed end, e.g. such that, at the outfeed end, the conveyor structures are arranged side by side with their rotation axis being substantially vertical,
- a driving unit for driving the conveyor structures in opposite rotational directions such that adjacent sides of the conveyor structures are moving in the same direction from the infeed end towards the outfeed end, wherein the method comprises:
  receiving, at the infeed end, the incoming food products such that the food products are between the belts of the conveyor structures,
  advancing the received food products from the infeed end towards the outfeed end while simultaneously rotating the received food products around said longitudinal axis of the food products.

In one embodiment, the food products are de-headed fish and, at the receiving end, the food products are received with the head end first, and the processing machine comprises a fish filleting machine, and the rotation of the de-headed fish is such that, at the outfeed end, the back side of the de-headed fish is facing up.

Accordingly, a simple method is provided for automatic infeed into machines like fish filleting machines, but this infeed method may of course also be implemented for other types of food processing machines.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
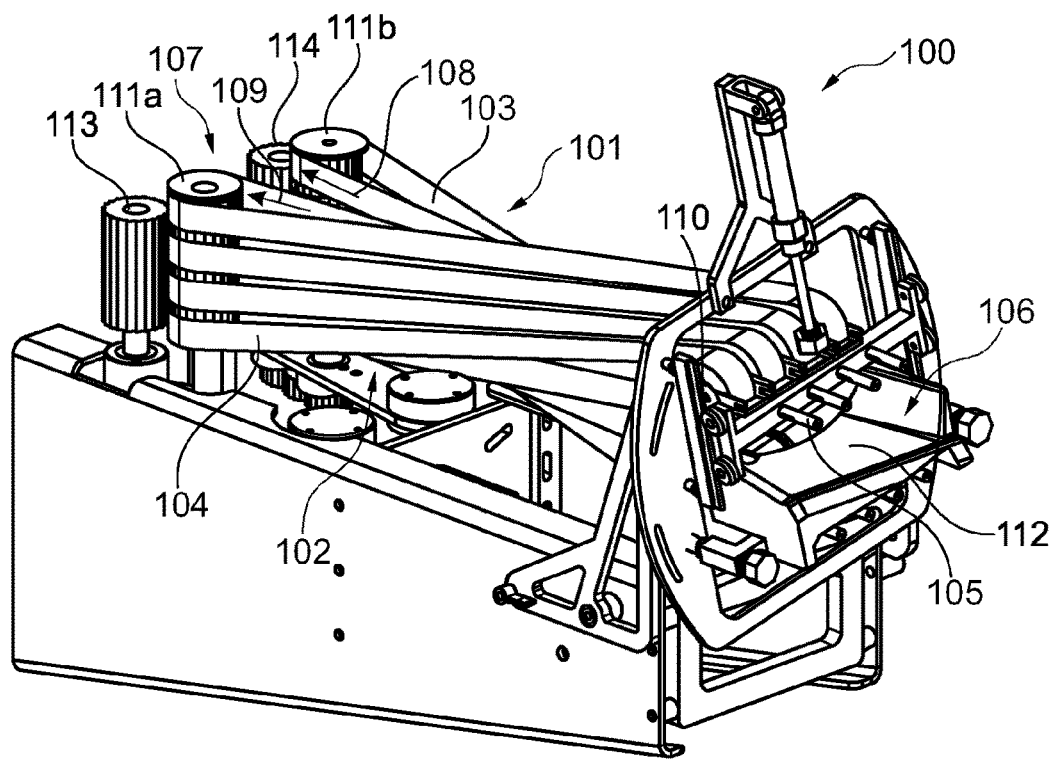
FIGS. 1 to 5 show one embodiment of an infeed system according to the present invention.

FIG. 1 shows a perspective view of an embodiment of an infeed system 100 according to the present invention for receiving and turning incoming food products (not shown), in particular de-headed fish, prior to entering a processing machine. The food products are arranged such that a longitudinal axis of the food products is essentially parallel to a conveying direction of the incoming food products, in the following example preferably with the head part first in case it is de-headed fish.

The infeed system comprises a pair of conveyor structures 101, 102, where each of the conveyor structures comprises four side by side arranged endless belts 103, 104 extending from an infeed end 106 of the infeed system to an outfeed end 107 of the infeed system. At the infeed end 106 the conveyor structures are arranged above and below each other with a space there between, and where the belts are twisted towards the outfeed end 107 such that at the outfeed end the conveyor structures 101, 102 are arranged side by side with their rotation axis being substantially vertical. The infeed end may be positioned adjacent to a conveyor (not shown) where the food product is received, where the food product may e.g. have undergone a first process, e.g. if the food product is de-headed fish, the first process may be a de-heading process and where the received de-headed fish is lying on the side preferably with the head end entering the infeed end.

The outfeed end may be positioned adjacent to a processing apparatus, e.g. a fish filleting machine, where the fish filleting machine may be designed such that the receipt of the fish is with the back side facing up. At the outfeed end, the ends of the pair of conveyor structures are connected to a spring load. This will be discussed in more details later.

The infeed system 100 further comprises a driving unit for driving the conveyor structures in opposite rotational directions such that adjacent sides of the conveyor structures are moving in the same direction as indicated by arrows 108, 109 from the infeed end towards the outfeed end. In an embodiment, each of the at least two side by side arranged belts 103, 104 extend between a driving wheel 111a,b comprising said driving unit and an idle wheel 110, and where the tightness of each of the belts is adjustable via e.g. adjustment screws 105 which may be spring loaded.

During use, the food product is received at the infeed end from e.g. a conveyor (not shown), where it is received at a support surface 112 and advanced such that, at the infeed end, the incoming food product is received and clamped between the belts of the conveyor structures and advanced from the infeed end 106 towards the outfeed end 107 while simultaneously rotating the received food product around said longitudinal axis of the food product. The tension of the belts is sufficient to ensure that the received food product does not slide out of the infeed system 100. To further ensure so, a support structure (not shown) is provided, e.g. any kind of rigidly placed plate, positioned between the infeed end and the outfeed end configured to supply a pressure onto at least one of said adjacent sides of the conveyor structures toward the other adjacent side. In that way, it is ensured that, at the middle between the infeed end and the outfeed end, the tightness of the belts is preserved.

The extra rollers 113, 114 positioned at the side and downstream to the driving wheels 111a,b shall be considered optional and are for maintaining the vertical arrangement of the food product when entering a subsequent processing machine, e.g. a fish filleting machine, but these rollers 113, 114 may be rotationally driven to facilitate the infeed into the subsequent processing machine.

Figures 2, 3:
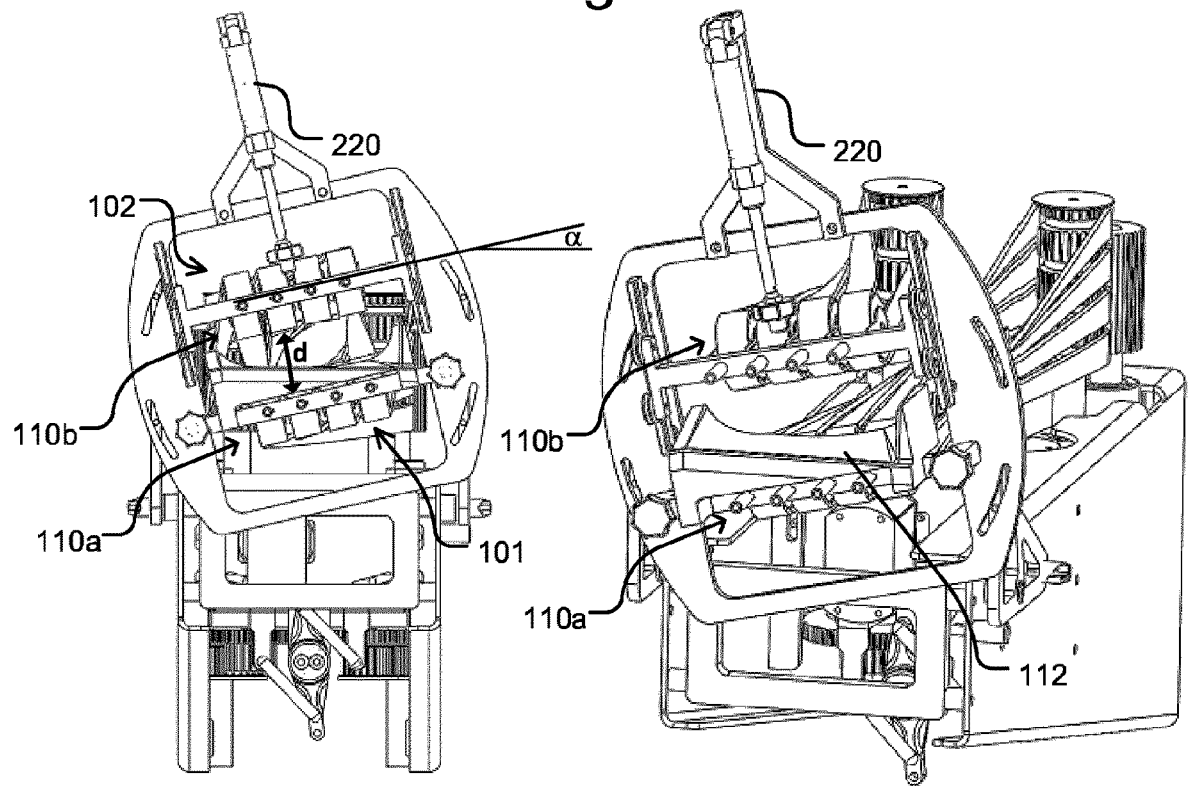

FIGS. 2 and 3 show a front view of the infeed system shown in FIG. 1, showing the above and below arrangement of the conveyor structures at the infeed end where the conveyor structures are spaced apart by a distance d.

In an embodiment, the infeed system 100 further comprises a moving device 220 connected to the conveyor structures at the infeed end configured, in response to a control signal indicating a position of an incoming food product, to increase the distance between the conveyor structures until the food product is at least partly received, and subsequently decreasing the distance between the conveyor structures at the infeed end.

As shown here, the tilting arrangement about an angle □ of the conveyor structures is to minimize the twisting of the belt, but the arrangement might just as well be such that the conveyor structures are horizontal at the infeed end. This might however result in too much twist which might damage the belts. This tilting angle □= may, as an example, be in the range of 15°, but the range may be between 10-20°. This shall however not be construed as being limited to this range.

Figure 4:
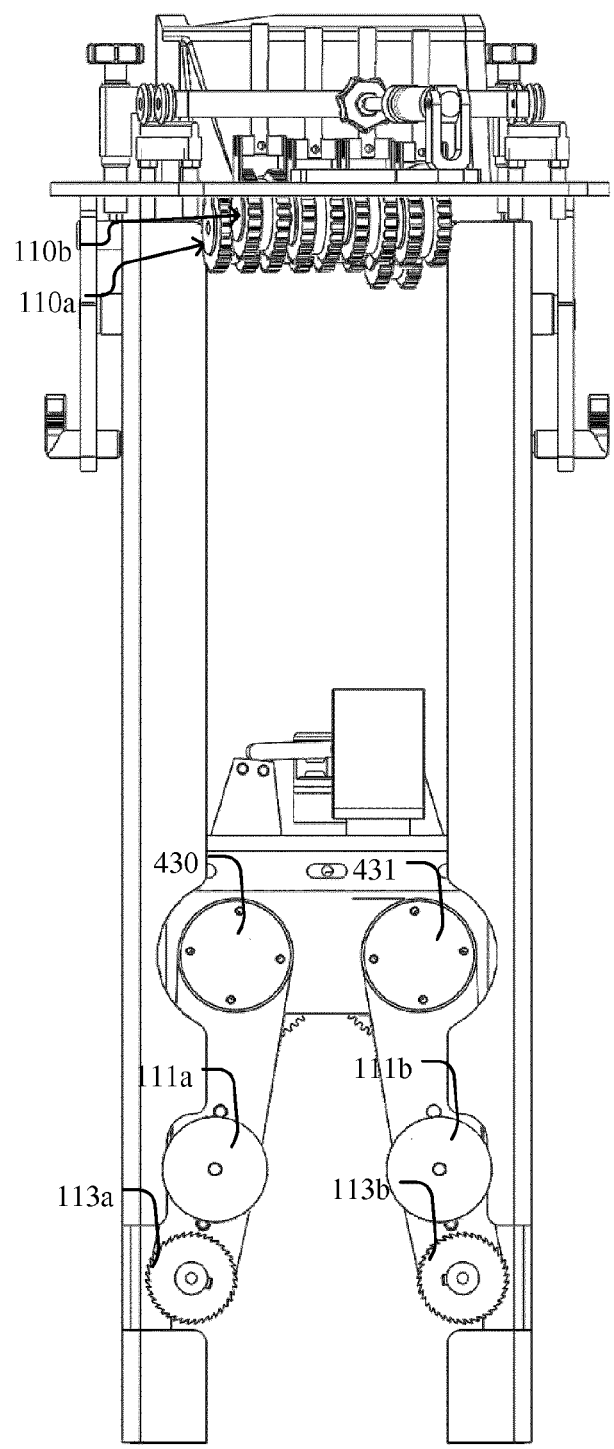
Figure 5:
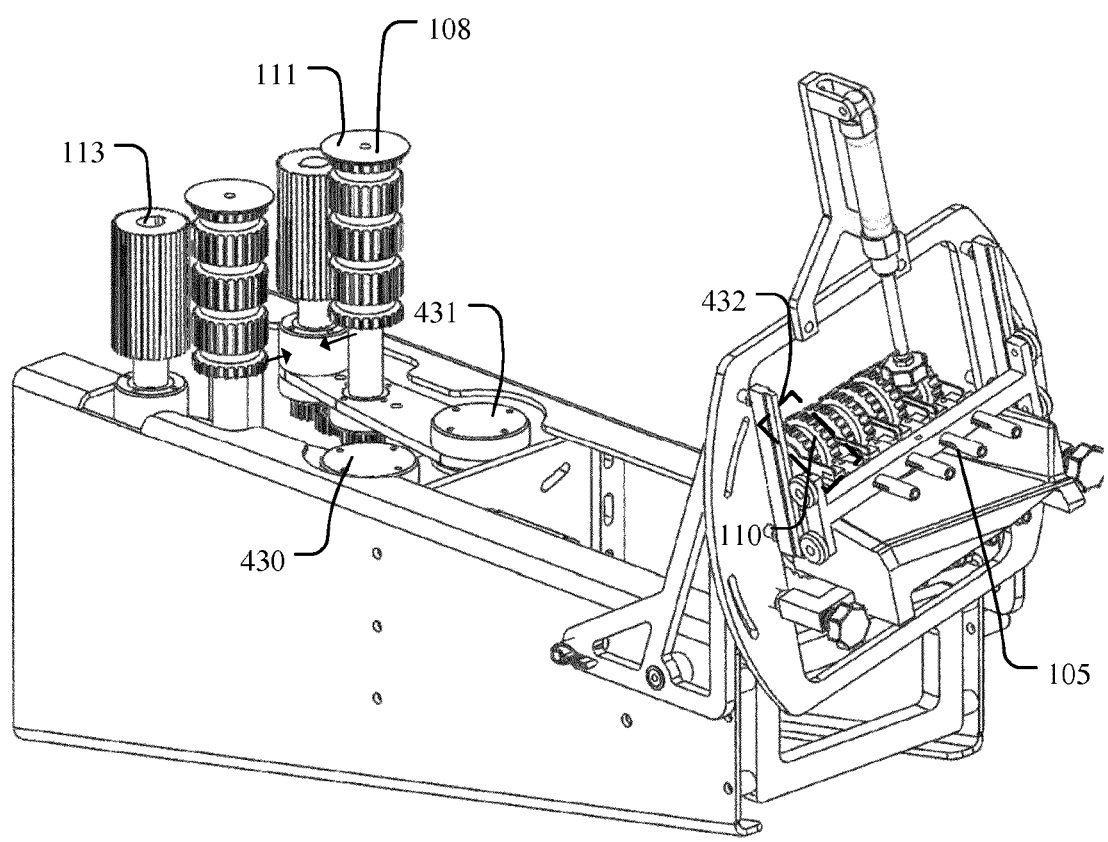

FIGS. 4 and 5 show a top view and a perspective view of the infeed system shown in FIGS. 1 to 3 in the absence of the endless belts 103, 104, showing where at the infeed end and the outfeed end, a pair of roller arrangements is shown at the ends, respectively, where e.g. at the outfeed end the two side by side arranged belts extends between a driving wheel 111a,b comprising said driving unit and an idle wheel 110.

Each of the four belts 103, 104 shown in FIGS. 1 to 3 may, in a preferred embodiment, be associated to a roller portion 432, in this case there are four roller portions that are spaced apart from each other. The tightness of each of the belts is adjustable via said adjustment screws 105, where one adjustment screw is associated with each roller portion. In that way, the tightness of each of the four belts shown here (may be two or more) may be adjusted via adjustment of each roller portion 432.

As already discussed, at the outfeed end, the ends of the pair of conveyor structures are connected to a spring load 430, 431 with resulting spring forces pointing towards each other as indicated by the arrows, and where, during advancing the food products from the infeed end towards the outfeed end, the ends of the pair of conveyor structures are thus capable of following the thickness of the food products. Accordingly, it is ensured that the tightness is preserved and adapted to the different thicknesses of food products while being advanced where the outfeed ends simply follow the outer shape of the food products.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

NUMBERED EMBODIMENTS

1. An infeed system (100) for receiving and turning incoming food products, in particular de-headed fish, prior to entering a processing machine, where the food products are arranged such that a longitudinal axis of the food products is essentially parallel to a conveying direction of the incoming food products, comprising:
   a pair of conveyor structures (101, 102), where each of the conveyor structures comprises at least two side by side arranged endless belts (103, 104) extending from an infeed end (106) of the infeed system to an outfeed end (107) of the infeed system, where at the infeed end the conveyor structures are arranged above and below each other, and where the belts are twisted towards the outfeed end such that at the outfeed end the conveyor structures are arranged side by side with their rotation axis being substantially vertical,
   a driving unit (111a,b) for driving the conveyor structures in opposite rotational directions such that adjacent sides of the conveyor structures are moving in the same direction (108, 109) from the infeed end towards the outfeed end, wherein at the infeed end the incoming food products are received and clamped between the belts of the conveyor structures and advanced from the infeed end towards the outfeed end while simultaneously rotating the received food products around said longitudinal axis of the food products.
2. The infeed system according to embodiment 1, wherein each of the at least two side by side arranged belts extends between a driving wheel comprising said driving unit and an idle wheel (110), and where tightness of each of the belts is adjustable (105).
3. The infeed system according to embodiment 1 or 2, wherein at the outfeed end the ends of the pair of conveyor structures are connected to a spring load (430, 431) with a resulting spring forces pointing towards each other, and where during advancing the food products from the infeed end towards the outfeed end the ends of the pair of conveyor structures follow the thickness of the food products.
4. The infeed system according to any of the preceding embodiments, wherein the rotation axis at the infeed end are inclined.
5. The infeed system according to embodiment 4, wherein the angle of the inclined rotation axis is from 10-20o, preferably around 15o.
6. The infeed system according to any of the preceding embodiments, further comprising a moving device connected to the conveyor structures at the infeed end configured to, in response to a control signal indicating a position of an incoming food product, to increase the distance between the conveyor structures until the food product is at least partly received, and subsequently decreasing the distance between the conveyor structures at the infeed end.

7. The infeed system according to any of the preceding embodiments, further comprising a support structure positioned between the infeed end and the outfeed end configured to supply a pressure onto at least one of said adjacent sides of the conveyor structures toward the other adjacent side.

8. A method of receiving and turning incoming food products, in particular de-headed fish, prior to entering a processing machine, where the food products are arranged such that a longitudinal axis of the food products is essentially parallel to a conveying direction of the incoming food products, where the receiving and turning is performed by a infeed system which comprises:
a pair of conveyor structures (101, 102), where each of the conveyor structures comprises at least two side by side arranged endless belts (103, 104) extending from an infeed end (106) of the infeed system to an outfeed end (107) of the infeed system, where at the infeed end the conveyor structures are arranged above and below each other, and where the belts are twisted towards the outfeed end such that at the outfeed end the conveyor structures are arranged side by side with their rotation axis being substantially vertical,
a driving unit (111*a,b*) for driving the conveyor structures in opposite rotational directions such that adjacent sides of the conveyor structures are moving in the same direction (108, 109) from the infeed end towards the outfeed end, wherein the method comprises:
receiving, at the infeed end, the incoming food products such that the food products between the belts of the conveyor structures,
advancing the received food products from the infeed end towards the outfeed end while simultaneously rotating the received food products around said longitudinal axis of the food products.

9. The method according to embodiment 8, wherein the food products are de-headed fish and where at the receiving end the food products are received with the head end first, and where the processing machine comprises a fish filleting machine, and where the rotation of the de-headed fish is such that at the outfeed end the back side of the de-headed fish is facing up.

The invention claimed is:

1. An infeed system for receiving and turning incoming food products, in particular de-headed fish, prior to entering a processing machine, where the food products are arranged such that a longitudinal axis of the food products is essentially parallel to a conveying direction of the incoming food products, comprising:
a pair of conveyor structures, where each of the conveyor structures comprises at least one endless belt extending from an infeed end of the infeed system to an outfeed end of the infeed system, where, at the infeed end, the conveyor structures are arranged above and below each other, and where the belts are twisted towards the outfeed end such that, at the outfeed end, the conveyor structures are arranged side by side,
a driving unit for driving the conveyor structures in opposite rotational directions such that adjacent sides of the conveyor structures are moving in the same direction from the infeed end towards the outfeed end,
wherein, at the infeed end, the incoming food products can be received and clamped between the belts of the conveyor structures and advanced from the infeed end towards the outfeed end while simultaneously rotating the received food products around said longitudinal axis of the food products.

2. The infeed system according to claim 1, wherein each of the belts extends between a first wheel at the infeed end and a second wheel at the outfeed end, the first wheel defining a first wheel rotation axis extending in a first direction and the second wheel defining an second wheel rotation axis extending in a second direction different from the first direction.

3. The infeed system according to claim 2, wherein the first direction is inclined.

4. The infeed system according to claim 3, wherein the angle of the inclined first direction is from 10-20°.

5. An infeed system according to claim 1, wherein the second direction is vertical.

6. The infeed system according to claim 1, wherein one of the first and second wheels is a driving wheel comprising said driving unit and the other one of the first and second wheels is an idle wheel.

7. The infeed system according to claim 1, where a tightness of each of the belts is adjustable.

8. The infeed system according to claim 1, comprising a spring load configured to provide a spring force pointing from an end of one of the conveyor structures towards an adjacent end of the other one of the conveyor structures of the pair of conveyor structures, and where, during advancing the food products from the infeed end towards the outfeed end, the ends of the pair of conveyor structures thereby are allowed to follow a thickness of the food products.

9. The infeed system according to claim 1, further comprising a moving device connected to the conveyor structures at the infeed end configured to, in response to a control signal indicating a position of an incoming food product, to increase the distance between the conveyor structures until the food product is at least partly received, and subsequently decreasing the distance between the conveyor structures at the infeed end.

10. The infeed system according to claim 1, further comprising a support structure positioned between the infeed end and the outfeed end configured to supply a pressure onto at least one of said adjacent sides of the conveyor structures toward the other adjacent side.

11. The infeed system according to claim 1, where each of the conveyor structures comprises at least two side by side arranged endless belts.

12. A method of receiving and turning incoming food products, in particular de-headed fish, prior to entering a processing machine, where the food products are arranged such that a longitudinal axis of the food products is essentially parallel to a conveying direction of the incoming food products, where the receiving and turning is performed by a infeed system which comprises:
a pair of conveyor structures, where each of the conveyor structures comprises at least one endless belt extending from an infeed end of the infeed system to an outfeed end of the infeed system, where at the infeed end the conveyor structures are arranged above and below each other, and where the belts are twisted towards the outfeed end,
a driving unit for driving the conveyor structures in opposite rotational directions such that adjacent sides of the conveyor structures are moving in the same direction from the infeed end towards the outfeed end, wherein the method comprises:

receiving, at the infeed end, the incoming food products such that the food products between the belts of the conveyor structures, advancing the received food products from the infeed end towards the outfeed end while simultaneously rotating the received food products around said longitudinal axis of the food products.

13. The method according to claim 12, wherein the food products are de-headed fish and where at the receiving end the food products are received with the head end first, and where the processing machine comprises a fish filleting machine, and where the rotation of the de-headed fish is such that at the outfeed end the back side of the de-headed fish is facing up.

\* \* \* \* \*

UNITED STATES PATENT AND TRADEMARK OFFICE
CERTIFICATE OF CORRECTION

PATENT NO. : 10,827,762 B2  
APPLICATION NO. : 16/484259  
DATED : November 10, 2020  
INVENTOR(S) : Bjarne Kjeld Jakobsen Page 1 of 1

It is certified that error appears in the above-identified patent and that said Letters Patent is hereby corrected as shown below:

In the Specification

Column 1
Line 15, remove [e.g.]

Column 3
Line 26, change "defined a" to –defined by a–

Column 5
Line 33, change "angle □" to –angle α–
Line 38, change "angle □" to –angle α–
Line 51, change "to" to –with–

Column 7
Line 19, change "a infeed" to –an infeed–
Line 36, change "products between" to –products are between–

In the Claims

Column 8
Line 11, change "an" to –a–

Column 9
Line 3, change "products between" to –products are between–

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*